United States Patent
Cory et al.

(10) Patent No.: US 12,342,025 B2
(45) Date of Patent: *Jun. 24, 2025

(54) SYSTEMS AND METHODS OF DYNAMIC OPTIMIZATION OF DATA ELEMENT UTILIZATION ACCORDING TO OBJECTIVES

(71) Applicant: ADAP.TV, Inc., Dulles, VA (US)

(72) Inventors: Amir Cory, Palo Alto, CA (US); Shubo Liu, Belmont, CA (US)

(73) Assignee: ADAP.TV, INC., Dulles (VA)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,021

(22) Filed: Nov. 28, 2022

(65) Prior Publication Data

US 2023/0087620 A1  Mar. 23, 2023

Related U.S. Application Data

(63) Continuation of application No. 17/316,806, filed on May 11, 2021, now Pat. No. 11,540,001, which is a
(Continued)

(51) Int. Cl.
*G06Q 30/00* (2023.01)
*G06F 16/23* (2019.01)
(Continued)

(52) U.S. Cl.
CPC ......... *H04N 21/2668* (2013.01); *G06F 16/23* (2019.01); *G06F 16/25* (2019.01);
(Continued)

(58) Field of Classification Search
None
See application file for complete search history.

(56) References Cited

U.S. PATENT DOCUMENTS

| 8,311,863 | B1 | 11/2012 | Kemp |
| 9,280,785 | B1 | 3/2016 | Jain |

(Continued)

OTHER PUBLICATIONS

Micro-specialization: Dynamic code specialization in DBMSes, Author: Zhang, Rui. Publication info: The University of Arizona. ProQuest Dissertations Publishing, 2012. (Year: 2012).*

(Continued)

*Primary Examiner* — Matthew T Sittner
(74) *Attorney, Agent, or Firm* — Bookoff McAndrews, PLLC

(57) ABSTRACT

Systems and methods are disclosed for optimizing data element usage according to user-defined objectives, comprising receiving a plurality of user-defined objectives associated with a group of data elements; receiving one or more constraints associated with the group of data elements, wherein at least one of the constraints comprises resources apportionable to each data element in the group of data elements; apportioning at least a portion of the resources to each data element in the group of data elements in a manner that meets the one or more constraints; receiving metrics associated with the performance of the group of data elements in meeting the plurality of user-defined objectives; determining an effectiveness of each data element in the group of data elements for meeting the plurality of user-defined objectives; and automatically revising the at least a portion of resources associated with each data element in the group of data elements.

19 Claims, 12 Drawing Sheets

Related U.S. Application Data continuation of application No. 16/112,165, filed on Aug. 24, 2018, now Pat. No. 11,032,597, which is a continuation of application No. 14/845,822, filed on Sep. 4, 2015, now Pat. No. 10,091,542, which is a continuation of application No. 14/754,102, filed on Jun. 29, 2015, now abandoned.

(51) Int. Cl.
| | | |
|---|---|---|
| *G06F 16/25* | (2019.01) | |
| *G06F 16/28* | (2019.01) | |
| *G06F 16/70* | (2019.01) | |
| *H04N 21/234* | (2011.01) | |
| *H04N 21/2385* | (2011.01) | |
| *H04N 21/258* | (2011.01) | |
| *H04N 21/2668* | (2011.01) | |
| *H04N 21/81* | (2011.01) | |

(52) U.S. Cl.
CPC ............ *G06F 16/285* (2019.01); *G06F 16/70* (2019.01); *H04N 21/23418* (2013.01); *H04N 21/2385* (2013.01); *H04N 21/25883* (2013.01); *H04N 21/812* (2013.01)

(56) References Cited

U.S. PATENT DOCUMENTS

| | | | |
|---|---|---|---|
| 10,067,655 | B2 | 9/2018 | Hamilton et al. |
| 10,091,542 | B1 | 10/2018 | Cory et al. |
| 2002/0144233 | A1 | 10/2002 | Chong et al. |
| 2003/0084156 | A1* | 5/2003 | Graupner .................. H04L 9/40 709/226 |
| 2004/0186776 | A1 | 9/2004 | Llach |
| 2005/0256778 | A1* | 11/2005 | Boyd ................. G06Q 30/0244 705/14.43 |
| 2006/0106843 | A1 | 5/2006 | Middelfart et al. |
| 2007/0050241 | A1 | 3/2007 | Jones et al. |
| 2007/0150509 | A1 | 6/2007 | Lev et al. |
| 2008/0065479 | A1 | 3/2008 | Tomlin et al. |
| 2008/0154662 | A1 | 6/2008 | Selvaraj et al. |
| 2008/0183558 | A1 | 7/2008 | Koran |
| 2008/0281681 | A1 | 11/2008 | Bremner et al. |
| 2010/0250332 | A1 | 9/2010 | Ghosh et al. |
| 2011/0029983 | A1 | 2/2011 | Lu et al. |
| 2011/0082755 | A1 | 4/2011 | Itzhak |
| 2012/0256915 | A1 | 10/2012 | Jenkins |
| 2012/0317603 | A1* | 12/2012 | Stopler ............ H04N 21/44227 725/81 |
| 2013/0215115 | A1 | 8/2013 | Jenkins |
| 2013/0219281 | A1 | 8/2013 | Trevelyan |
| 2013/0298192 | A1 | 11/2013 | Kumar et al. |
| 2014/0019262 | A1 | 1/2014 | Reitsma et al. |
| 2014/0025509 | A1 | 1/2014 | Reisz et al. |
| 2014/0067551 | A1* | 3/2014 | Schaub .............. G06Q 30/0273 705/14.69 |
| 2014/0122221 | A1* | 5/2014 | Jordan ................... G06Q 30/02 705/14.43 |
| 2014/0136336 | A1 | 5/2014 | Mak et al. |
| 2014/0303953 | A1 | 10/2014 | Bates |
| 2014/0324730 | A1* | 10/2014 | Santos .................. G06Q 40/06 705/36 R |
| 2014/0325055 | A1 | 10/2014 | Oh et al. |
| 2014/0374478 | A1 | 12/2014 | Dearing et al. |
| 2015/0106813 | A1 | 4/2015 | Mihalocivi et al. |
| 2015/0178756 | A1 | 6/2015 | Chao et al. |
| 2015/0235252 | A1* | 8/2015 | Chao .................. G06Q 30/0211 705/14.13 |
| 2015/0269770 | A1 | 9/2015 | Jenkins |
| 2015/0310484 | A1* | 10/2015 | Haile ................. G06Q 30/0246 705/14.45 |
| 2015/0373153 | A1 | 12/2015 | Jenkins |
| 2016/0132615 | A1* | 5/2016 | Inoue ..................... G06F 30/00 703/1 |
| 2016/0162910 | A1* | 6/2016 | Pradhan ............. G06Q 30/0201 705/7.23 |
| 2018/0367832 | A1 | 12/2018 | Cory et al. |

OTHER PUBLICATIONS

Development of a hybrid travel time forecasting model with GIS: Design and implementation issues, Author: You, Jinsoo. Publication info: University of Illinois at Urbana-Champaign. ProQuest Dissertations Publishing, 2000. (Year: 2000).*

Product Development Solutions, Author: Anonymous. Publication info: Industry Week 257.8: 63-64. Endeavor Business Media. (Aug. 2008) (Year: 2008).*

STIC EIC 3600 NPL Search Report for U.S. Appl. No. 16/112,165 dated Jan. 3, 2020. (Year: 2020).

STIC EIC 3600 NPL Search Report for U.S. Appl. No. 16/112,165 dated Oct. 13, 2020. (Year: 2020).

STIC EIC 3600 NPL Search Report for U.S. Appl. No. 16/112,165 dated May 27, 2020. (Year: 2020).

* cited by examiner

CAMPAIGNS

| CAMPAIGN/GROUP/AD | START DATE | END DATE | PACING | IMPRESSIONS | SPEND | BID | CR | TARGETING | OPTIONS |
|---|---|---|---|---|---|---|---|---|---|
| ▽ FASTERADE DOG FOOD, NBA CAMPAIGN ● P2 | 9/15/2014 | 9/15/2014 | 0% | 0 | $0 | $0 | - | 0.00% | ✦ |
| ▷ PRIVATE EXCHANGE AD GROUP ● P1 | 7/01/2014 | 7/01/2014 | 17% | 715,939 | $697 | $0 | - | 1.54% | ✦ |
| ▷ DIRECT INVENTORY AD GROUP ● P1 | 9/22/2014 | 9/22/2014 | 26% | 696,635 | $9,334 | $0 | - | 1.76% | ✦ |
| ▽ FASTERADE MARKETPLACE CAMPAIGN ● P1 | 7/01/2014 | 7/01/2014 | 0% | 0 | $0 | $0 | - | 0.00% | ✦ |
| ▷ FASTERADE GROUP 1 ● P1 | 9/15/2014 | 9/15/2014 | 0% | 0 | $0 | $0 | - | 0.00% | ✦ |
| ▷ FASTERADE GROUP 2 ● P2 | 7/01/2014 | 7/01/2014 | 0% | 0 | $0 | $0 | - | 0.00% | ✦ |
| ▽ TEST GROUP ● P2 | 9/22/2014 | 9/22/2014 | 0% | 0 | $0 | $0 | - | 0.00% | ✦ |

*FIG. 5*

| ALL CAMPAIGNS/ SAMPLE CAMPAIGN/ NEW AD GROUP | | |
|---|---|---|
| NEW AD GROUP | | |
| GENERAL | BID & OPTIMIZATION | ADS |

GENERAL OPTIONS

515 — STATUS  ⦿ PAUSED  ○ LIVE

AD GROUP NAME*  [NEW AD GROUP]

605 — NOTES  [            ]

607 ⎰ START #1*  [▼ MM/DD/YYYY] [⊙ 12:00 AM] ET
    ⎱ END #1*    [▼ MM/DD/YYYY] [⊙ 11:59 PM] ET

610 — [+ FLIGHT]

AD GROUP GOAL

615

620 — AD GROUP GOAL*  [$ AMOUNT] [USD] [SPEND]

ENABLE AUTO ALLOCATION ACROSS ADS  ⦿ ON  ○ OFF

[◆ TOTAL                      ◆]

ALL CAMPAIGNS/ SAMPLE CAMPAIGN/ NEW AD GROUP

NEW AD GROUP

| GENERAL | BID & OPTIMIZATION | ADS |

DELIVERY

705 — FREQUENCY CAPPING ○ YES ◉ NO

BILLING

710 — PRICE  $ [CPM AMOUNT] [USD]

715 — BUYER MARGIN  PERCENTAGE [% OF MEDIA COSTS AND VENDOR FEES]

720 — PASS-THROUGH COST  $ [CPM AMOUNT] [USD] CPM

ALL CAMPAIGNS/ 888 HOLDINGS, VIDEO EU, 2014 / TOYOTA INTENDERS AD GROUP I

NEW AD

| AD SUMMARY | GENERAL | INVENTORY | TARGETING | CREATIVES | BID & OPTIMIZATION |

GENERAL OPTIONS

1005 — STATUS ◉ PAUSED ○ LIVE

1010 — AD NAMES* [NEW AD]

1015 — AD GROUP [TOYOTA INTENDERS AD GROUP I]

NOTES [ ]

1020 — START #1* [MM/DD/YYYY] [12:00 AM] ET
END #1* [MM/DD/YYYY] [11:59 PM] ET
[+ FLIGHT]

1025 — GOAL #1* [# OF IMPRESSIONS] [IMPRESSIONS]
[+ GOAL]

1030 — MINIMUM GOAL ◉ YES ○ NO
[# OF IMPRESSIONS] [IMPRESSIONS] [TOTAL]

SYSTEMS AND METHODS OF DYNAMIC OPTIMIZATION OF DATA ELEMENT UTILIZATION ACCORDING TO OBJECTIVES

CROSS-REFERENCE TO RELATED APPLICATION(S)

This application is a continuation of and claims the benefit of priority to U.S. Nonprovisional application Ser. No. 16/112,165, filed Aug. 24, 2018 (now U.S. Pat. No. 11,032,597, issued on Jun. 8, 2021), which is a continuation of and claims the benefit of priority to U.S. Nonprovisional patent application Ser. No. 14/845,822, filed Sep. 4, 2015 (now U.S. Pat. No. 10,091,542, issued on Oct. 2, 2018), which is a continuation of and claims the benefit of priority to U.S. Nonprovisional patent application Ser. No. 14/754,102, filed Jun. 29, 2015 (abandoned), the entireties of which are incorporated herein by reference.

TECHNICAL FIELD

The disclosure generally relates to the field of data element optimization. More specifically, the disclosure relates to optimizing data element usage according to objectives.

BACKGROUND

Conventional data element optimization is a complex and time consuming process, and is often not quantified. For example, producers of online videos and other data elements promoting products and/or services may have a limited budget. Based on limited data, the producers may choose to use one promotional data element more often than another, but this decision is often based on subjective feelings about the merits of the data element's content.

Further, producers of data elements often have a plurality of objectives and constraints associated with the promotion of products and services. Prioritizing the objectives relative to each other while meeting all constraints is difficult, if not impossible, in real time.

SUMMARY OF THE DISCLOSURE

Systems and methods disclosed may optimize data element usage according to user-defined objectives, comprising receiving a plurality of user-defined objectives associated with a group of data elements; receiving one or more constraints associated with the group of data elements, wherein at least one of the constraints comprises resources apportionable to each data element in the group of data elements; apportioning at least a portion of the resources to each data element in the group of data elements in a manner that meets the one or more constraints; receiving one or more metrics associated with the performance of the group of data elements in meeting the plurality of user-defined objectives; determining an effectiveness of each data element in the group of data elements for meeting the plurality of user-defined objectives, wherein the effectiveness is determined based on the one or more metrics; and automatically revising the at least a portion of resources associated with each data element in the group of data elements based on the determined effectiveness in a manner optimized to meet the plurality of user-defined objectives within the one or more constraints.

Further techniques described herein may comprise receiving an additional constraint for association with the one or more constraints; and automatically revising the at least a portion of resources associated with each data element in the group of data elements based on the additional constraint. Automatically revising the at least a portion of resources associated with each data element in the group of data elements may further comprise receiving a weighting of each user-defined objective of the plurality of user-defined objectives; and automatically revising the at least a portion of resources associated with each data element in the group of data elements based on the determined effectiveness in a manner prioritizing a highest-weighted user-defined objective of the plurality of user-defined objectives within the plurality of constraints.

Systems and methods presented herein may further comprise designating a predetermined minimum allocation of the resources to each data element in the group of data elements until a predetermined minimum level of metrics associated with each data element in the group of data elements is obtained. Systems and methods may further lower the predetermined minimum allocation of the resources for each data element in the group of data elements as metrics associated with each data element in the group of data elements are obtained.

Systems and methods described herein may further automatically revise the at least a portion of resources associated with each data element in the group of data elements by determining at least one feasibility region based on the one or more constraints associated with the group of data elements; determining intersection points of constraints to form one or more candidate optimization points; and selecting a candidate optimization point from the one or more candidate optimization points by determining which candidate optimization point maximizes a highest priority user-defined objective from the plurality of user-defined objectives.

In system and methods described herein the one or more metrics may be determined over a predetermined time interval. Further, each data element in the group of data elements may correspond to a promotional video. Further, the resources may comprise financial resources.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 5 is an example user interface displaying data elements and data element groups.

FIG. 6 is an example user interface allowing the creation of one or more data element groups according to techniques presented herein.

FIG. 7 is an example user interface enabling the creation of one or more data element groups according to techniques presented herein.

FIG. 10 is an example user interface enabling the creation and/or selection of data elements that may be associated with a data element group.

FIG. 11 is an example user interface displaying data elements associated with a data element group according to techniques presented herein.

DETAILED DESCRIPTION

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
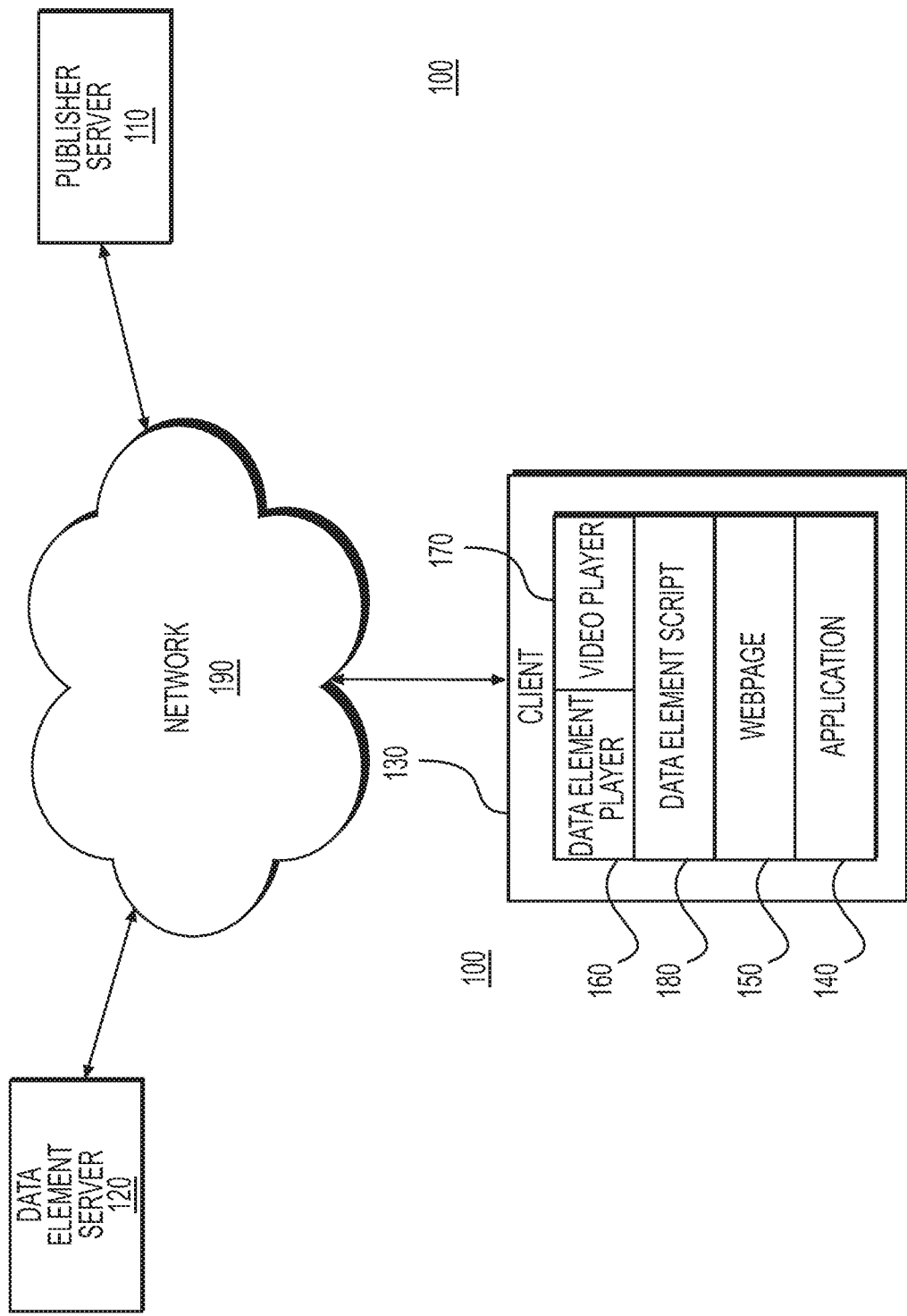
FIG. 1 is a high-level block diagram illustrating a system for dynamically optimizing the use of data elements in accordance with objectives and constraints.

FIG. 1 is a high-level block diagram of a computing environment 100 for dynamically optimizing data elements according to one embodiment. The computing environment 100 may include a publisher server 110, a data element server 120, and a client 130 communicatively coupled by a network 190. In one embodiment, the publisher server 110 and the data element server 120 may be web servers. In another embodiment, the publisher server 110 may be an application server that provides an instance of one or more applications 140 to the client 130. In yet another embodiment, the publisher server 110 and data element server 120 may provide data to support the execution of the application 140 on the client 130. The client 130 is a computer or other electronic device which may be used by one or more users to perform activities which may include browsing web pages on the network 190, or using application 140. The client 130, for example, may be a personal computer, personal digital assistant (PDA), or a mobile telephone. Only one publisher server 110, one data element server 120, and one client 130 are shown in FIG. 1 in order to simplify and clarify the description. Other embodiments of the computing environment 100 may include any number of publisher servers 110, data element servers 120, and/or clients 130 connected to the network 190. Further, while the publisher server 110 and data element server 120 are depicted as separate in the example of FIG. 1, the features of both the publisher server 110 and data element server 120 may be integrated into a single device on the network 190.

The network 190 represents the communication pathways between (e.g., communicatively coupled) the publisher server 110, data element server 120, and client 130. In one embodiment, the network 190 is the Internet. The network 190 may also include dedicated or private communications links that are not necessarily a part of the Internet. In one embodiment, the network 190 uses various communications technologies and/or protocols. Thus, the network 190 may include links using technologies such as Ethernet, 802.11, integrated services digital network (ISDN), digital subscriber line (DSL), asynchronous transfer mode (ATM), etc. Similarly, the networking protocols used on the network 190 may include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links may be encrypted using encryption technologies such as the secure sockets layer (SSL), transport layer security (TLS), secure HTTP (HTTPS), and/or virtual private networks (VPNs). In another embodiment, the entities may use custom and/or dedicated data communications technologies instead of, or in addition to, the ones described above.

As shown in FIG. 1, client 130 may execute an application, such as a web application or browser, that allows a user to retrieve and view content stored on other computers or servers on the network 190. The application 140 may also allow the user to submit information to other computers on the network 190, such as through user interfaces 150, web pages, application program interfaces (APIs), and/or other data portals. In one embodiment, the application 140 is a web browser, such as MICROSOFT INTERNET EXPLORER or MOZILLA FIREFOX. The application 140 may support technologies including JavaScript, ActionScript, and other scripting languages that allow the client 130 to perform actions in response to scripts and other data sent to the application via the network 190. In some embodiments, functions ascribed herein to the application 140 are implemented via plug-ins such as ADOBE FLASH.

The publisher server 110 may deliver data associated with a user interface 150, such as a web page, to the application 140 over the network 190. The application 140 may then load the user interface 150 and present it to the user. User interface 150 may correspond to any of the user interfaces discussed herein, and any of the user interfaces which may be displayed by application 140. The user interface 150 may include a video player 170 for presenting online videos and a data element player 160 which may present associated and/or promotional materials to the user. The data element player 160 may be used to display any of the data elements discussed herein to a user. The video player 170 can be any video player suitable for online video such as WINDOWS MEDIA PLAYER, REALPLAYER, QUICKTIME, WINAMP, or any number of custom video players built to run on a suitable platform such as the Adobe Flash platform.

The data element player 160 may comprise JavaScript, ActionScript and/or other code executable by the application 140 that may be delivered to the client 130 in addition to or as part of the user interface 150. A data element script 180 may contain code readable and/or transformable by the data element player 160 into operational instructions that govern behavior of the data element player 160. The application may execute the data element player 160 natively, directly (e.g., as JavaScript) or via a browser plug-in module (e.g., as a Flash plug-in). The data element player 160 may communicate with the data element server 120 over the network 190 to request and receive content for presentation on the client 130. A data element may comprise any computer-executable code (e.g., JavaScript, ActionScript, Flash, or HTML) whose execution may result in the presentation of text, images, and/or sounds to the user. The text, images, and/or sounds may promote one or more products, services, viewpoints and/or actions. A data element can be a linear data element (i.e., promotional content that interrupts the presentation of a video) or a non-linear data element (i.e., promotional content that is presented concurrently with a video) presented either before, during, or after the video. A data element can also be textual, graphical (such as a banner promotion), or a video promotion. A data element can be presented as overlaying the online video or in any other position within the user interface 150. A data element can also be interactive and, in one embodiment, a data element can transition from one of the aforementioned varieties of promotional data elements to a different variety or trigger an additional data element in response to an action by the user.

Figure 2:
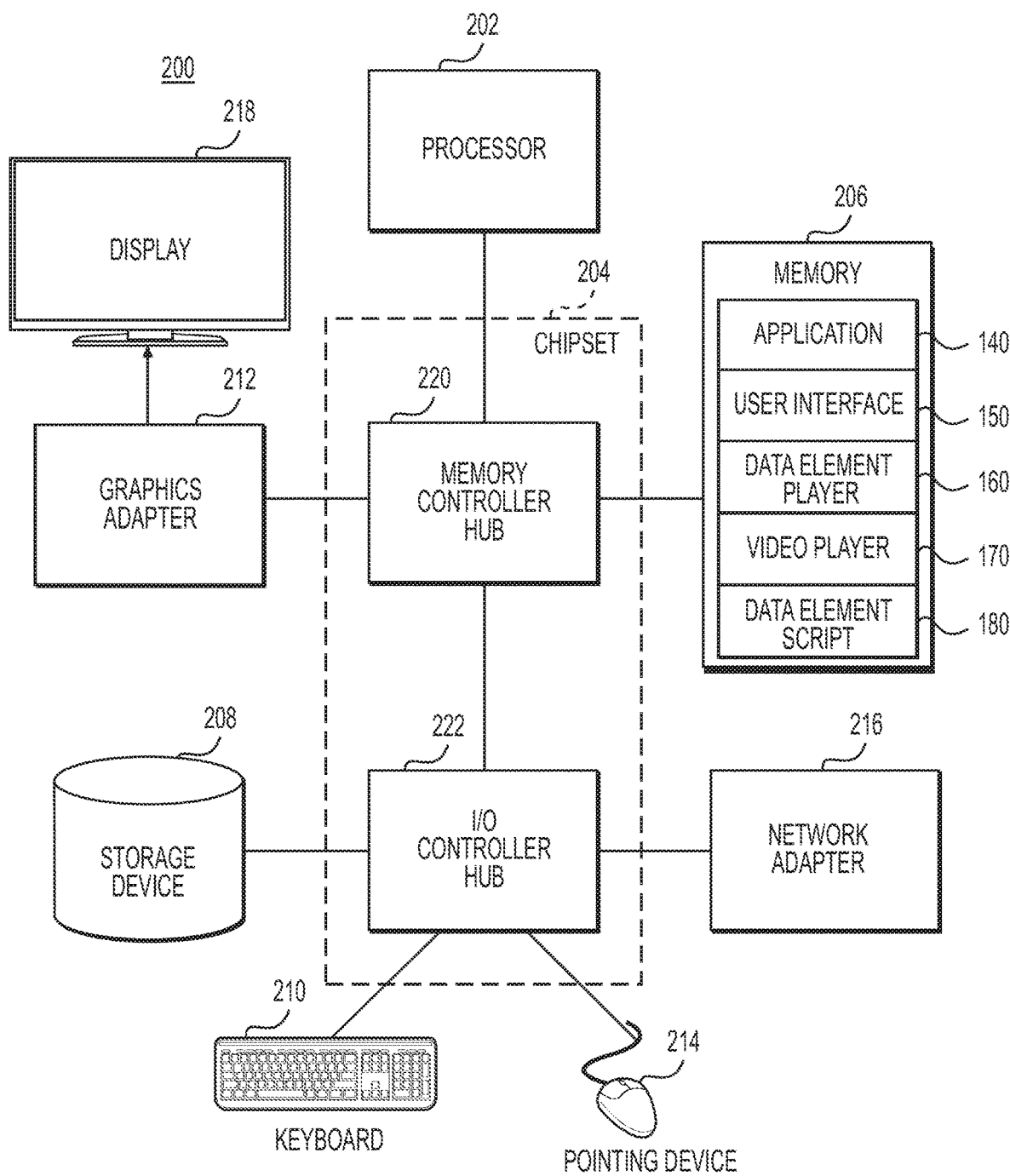
FIG. 2 is a high-level block diagram illustrating an example of a computer for use as a server and/or as a client according to techniques presented herein.

FIG. 2 is a high-level block diagram illustrating on example of a computer 200 for use as a client 130 and/or as a server, such as a publisher server 110 or a data element server 120. Illustrated are at least one processor 202 coupled to a chipset 204. The chipset 204 may include a memory controller hub 220 and/or an input/output (I/O) controller hub 222. A memory 206 and a graphics adapter 212 may be coupled to the memory controller hub 220, and a display 218 is coupled to the graphics adapter 212. A storage device 208, keyboard 210, pointing device 214, and network adapter 216 may be coupled to the I/O controller hub 222. Other embodiments of the computer 200 have different architectures. For example, the memory 206 may be directly coupled to the processor 202 in some embodiments.

The computer 200 may be adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 208, loaded into the memory 206, and executed by the processor 202. The storage device 208 is a computer-readable storage medium such as a hard drive, compact disk read-only memory (CD-ROM), DVD, or a solid-state memory device. The memory 206 is also a computer-readable storage medium and stores computer-executable instructions and data used by the processor 202.

In one embodiment, the memory 206 stores computer-executable instructions that cause the processor 202 to implement a method for displaying data elements. The computer-executable instructions stored by the memory comprise instructions for the application 140. In one embodiment, after delivery of the user interface 150 and data element script 180 to the client 130 by the publisher server 110, the computer-executable instructions stored by the memory 206 further comprise instructions for the user interface 150, the data element player 160, the video player 170, and the data element script 180 as shown in FIG. 2.

The pointing device 214 may be a mouse, track ball, touch screen, or other type of pointing device, and is used in combination with the keyboard 210 to input data into the computer system 200. The graphics adapter 212 displays images and other information on the display 218. The network adapter 216 couples the computer system 200 to the network 190. Some embodiments of the computer 200 have different and/or other components than those shown in FIG. 2.

The types of computers 200 used by the entities of FIG. 1 can vary depending upon the embodiment and the processing power required by the entity. For example, a client 130 that is a mobile telephone typically has limited processing power, a small display 218, and might lack a pointing device 214. A server providing a data element server 120, in contrast, might comprise multiple servers working together to provide the functionality described herein. Also, a server typically lacks hardware such as the graphics adapter 212, the display 218, and user input devices.

Some portions of the above description describe embodiments in terms of algorithms and symbolic representations of operations on information. For example, the description corresponding to FIGS. 2-12 relate to techniques that optimize data element usage. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to depict to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Software and firmware configurations of the modules and corresponding instructions described above can be stored in, for example, the storage device 208 and/or the memory 206 and can be executed by, for example, the processor 202, adapters 212, 216, controllers 220, 222, and/or multiple such devices operating in parallel.

Figure 3:
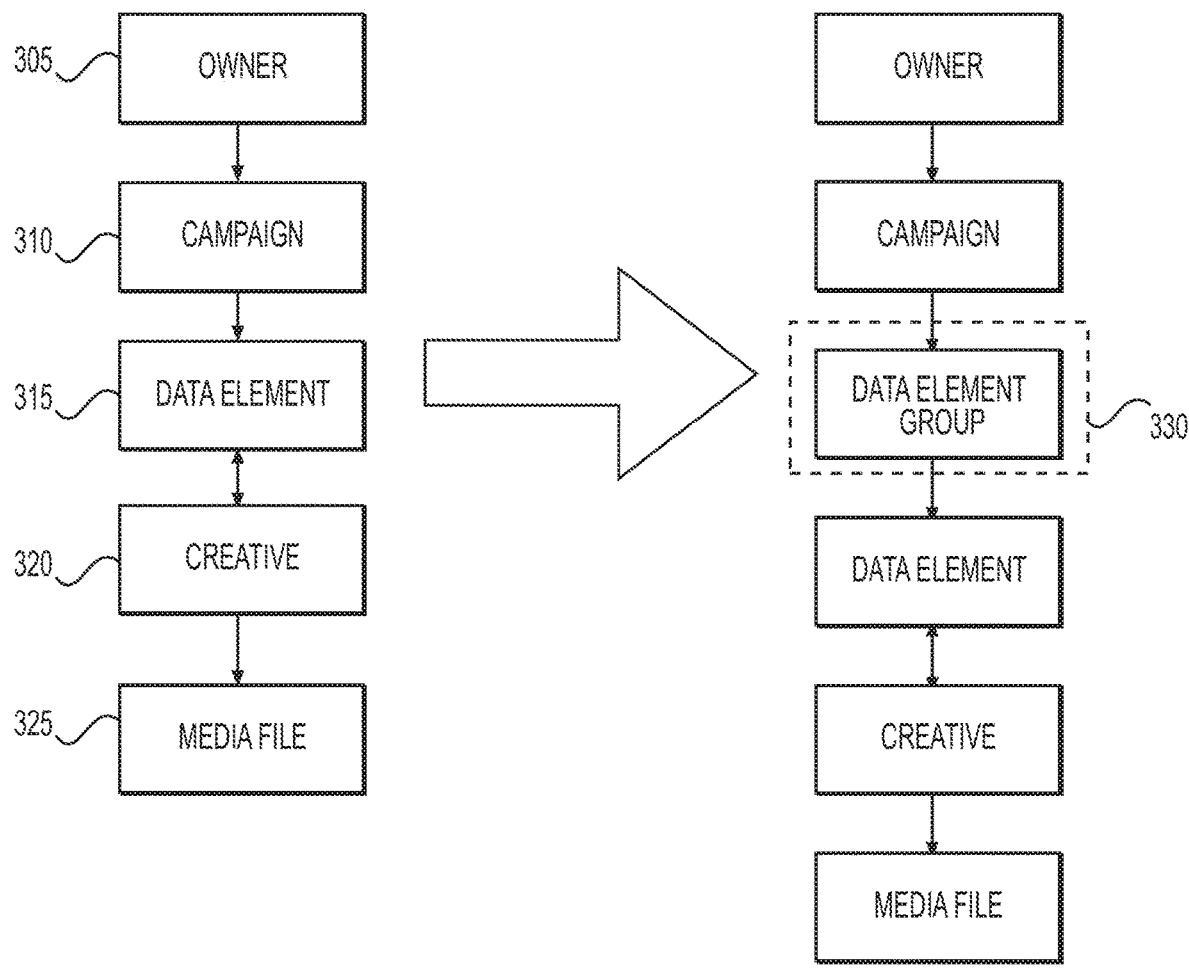
FIG. 3 is a block diagram illustrating an example object hierarchy according to techniques presented herein.

FIG. 3 illustrates a block diagram of an object hierarchy according to techniques presented herein. In one technique, an owner 305, who may be a creator and/or producer of data elements, such as promotional data elements, and may be a buyer of promotional space, may manage or otherwise own one or more campaigns 310. In general herein, a user of the application 140 and/or client 130 will be referred to as a "user," though the user may or may not be the owner 305. A campaign 310 may be a collection of one or more data elements 315 that share a common idea or theme. As discussed above, a data element 315 may comprise any computer-executable code whose execution may result in the presentation of text, images, and/or sounds to the user. Each data element 315 may further comprise one or more creatives 320, each of which may correspond to at least a portion of the text, images, and/or sounds presented to the user. Finally, each creative 320 may further comprise one or more media files 325, such as textual, image, and/or audio files.

In another technique, data elements may be organized into one or more data element groups 330. The data element group 330 may enable users to more effectively plan and optimize the meeting of constraints relating to data elements that share common objectives and/or budgets. For example, a user may have a business objective of programming allocating resources, such as a budget, across promotional data elements in the most cost-effective manner. The data element group 330 object may allow the owner to organize groups of data elements 315 that share one or more common objectives. While one campaign may be associated with a plurality of data element groups, the application may enforce a rule that data element groups cannot be shared across multiple campaigns. Further, the application may require that at least one data element 315 be associated with a data element group 330. While data elements 315 may be associated with a data element group 330, the application may allow data elements 315 to remain unassociated with a data element group 330.

As will be shown, techniques discussed herein may allow an owner 305 to monitor data element group 330 performance via one or more user interfaces 150. Owners 305 may be able to forecast supply, pricing, and performance associated with data elements 315 and data element groups 330. Owners may also be able to programmatically optimize budget allocation across data elements that perform the best according to one or more objectives and/or one or more constraints. Owners may further be able to manually optimize allocations of resources, and may allocate more resources, such as a budget, to better performing data elements. Owners may also be able to run reports against data element group performance, further enabling the selection of the most effective data elements for reaching a given set of objectives and constraints.

Figure 4:
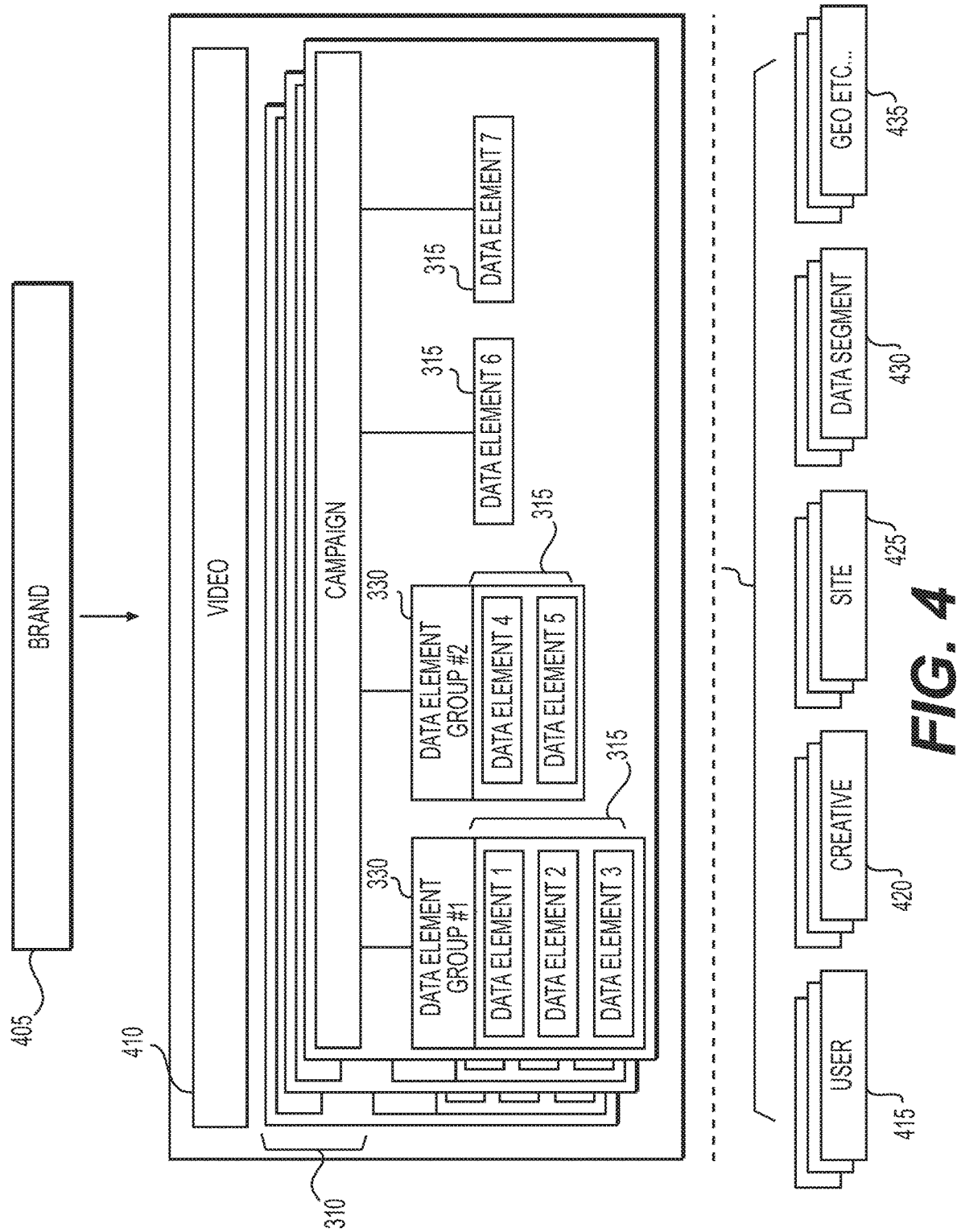
FIG. 4 is a block diagram illustrating an example of the grouping of data elements into data element groups according to techniques presented herein.

FIG. 4 is a block diagram illustrating an example of the grouping of data elements into data element groups according to techniques presented herein. As discussed above, data elements may be used as promotional content, and may be associated with a brand 405. The medium for the presentation of promotional content may be video 410, although other mediums would be consistent with techniques presented herein. A given brand 405 may have a one or more associated campaigns 310. Each campaign 310 may, in turn, have any number of data element groups 330 and any number of data elements 315 associated therewith. Constraints may be set at the campaign level, for example, for resource constraints, such as a budget. These constraints may bind objects lower on the object hierarchy, such as individual data element groups 330 and data elements 315. Similarly, constraints set at the data element group level 330 may bind data elements 330 associated with the data element groups 330.

Data element groups 330 may be created by an owner 305, or some other administrator or sufficiently privileged user. Alternatively, data elements may have associated tags and/or properties, and data elements 315 may be automatically grouped into data element groups 330 based upon these tags and/or properties. For example, data elements 315 sharing similar optimization objectives and/or maximum effective cost per thousand impressions ("eCPM") may be grouped under one data element group 330. Forecasts of delivery and/or key performance indicators ("KPIs") may be determined and/or viewed at the data element group 330 level as well at the level of individual data elements within the data element group. Budgets may be automatically allocated across multiple data elements 315 within a given data element group 330.

One or more users 415, which may correspond to one or more owners 305, may access the application in order to create and associate data element groups 330 and data elements 315. The data element groups 330 and data elements 315 may utilize one or more creatives 420, which may be stored in a data store, such as storage device 208. Data element groups 330 and/or data elements 315 may further be utilized in relation to one or more sites 425, such as websites, and segments 430. Sites 425 may be used to target certain topics, for example sports and/or entertainment. Segments 430 may be target audience objects. For example, a data segment 430 object may represent females 18 and over. Data element groups 330 and/or data elements 315 may also be utilized in relation to geographic areas 435. For example, a data element group may contain only promotional data elements that are to be run in a particular geographic region.

As discussed herein, objectives and/or constraints may be optimized in order to meet or exceed the one or more objectives within any constraints. For example, objectives may be to hit a target eCPM for a given budget, to maximize target impressions, to maximize the completion rate, and/or to maximize the click-through rate. Any number of other objectives or goals ("KPIs") may be used. Optimization, for example of a budget, may occur in multiple ways. Optimization may occur across video channels, for example by optimizing how much of a budget to apportion to each video channel given an assessment of the effectiveness of the channel towards meeting the one or more objectives. Optimization may also occur across multiple campaigns 310, a campaign being a collection of related data elements 315 and/or data element groups 330. One campaign may be determined to be more effective than another campaign in a certain medium or in promoting a certain brand, and resources may be balanced accordingly. Optimization may further occur across data element groups 330 within a given campaign. Some data element groups may prove to be more effective at meeting objectives and constraints than others, and resources may be continually rebalanced accordingly. This optimization may include data elements that are not affiliated with data element groups. Optimization may further occur across data elements, such as the data elements within a given data element group. In this manner, individual data elements that perform better for a given set of objectives and/or constraints may be given more resources or otherwise utilized more frequently. Further, optimization may be applied at the level of creatives, which may comprise a portion or version of a given data element. Optimization may also occur when selecting an optimal price of a bid, if, for example, bidding for space to promote data elements. Thus, optimization may occur at one or many levels of the object hierarchies shown in FIG. 3.

FIG. 5 is an example campaign user interface 500 displaying data elements and data element groups. The campaign user interface 500 may display any campaigns 505 to which the application user has access to view, such as any and all campaigns associated with a given owner 305. The campaign user interface 500 may also display any data element groups and/or independent data elements associated with each campaign. Each campaign 505 may have associated data element groups listed beneath, which may themselves have associated data elements listed beneath. The data element groups, data elements, and campaign listings may be expanded by default, contracted by default, or some items may be expanded or contracted, according to user preference. For example, a user may select that campaigns 505 are expanded, showing all associated data element groups associated therewith, but the data element groups themselves may be contracted by default, such that the user cannot immediately see the data elements associated with each data element group.

The campaign user interface 500 may further display fields associated with each campaign, such as the campaign's name 510, active/inactive status 515, start and end dates 520, pacing 525, impressions 530 (number of times a data element is presented to a member of the target audience), amount spend 535 thus far, bid 540 (which may comprise the average bid for impressions of a promotional data element, or per thousand impressions, etc.), click rate 545, targeting 550, and other options 555.

Pacing 525 may indicate a rate at which data elements are being made available relative to a goal. For example, in advertising, if a data element has a spend goal of $10 over a 10 second period, pacing is 100% if $10 is actually spent delivering the data element to an audience during that time. Pacing would be 200% if $20 was spent delivering the data element during that time period, and so on.

Targeting may be a filtering mechanism to make sure that promotional data elements run against a qualified pool of inventory and audience. For example, certain devices (e.g., only tablet computers), platforms (e.g. only Android), topics (e.g., only sites that over index for sports), audience segments (e.g., only females 18 and up), time periods (e.g., only evenings), may be specifically targeted. Techniques discussed herein may attempt to optimize for targeting to find the most valuable impressions for the cost.

A user of application 140 might create a new data element group in the campaign user interface 500 in a number of ways. For example, the user might select "create new" 510 to create a new data element group for association with a certain campaign. A user may also be able to clone an existing data element group, which may clone the data element group and any associated data elements. A user may also be able to create or delete data elements within a data element group, or data elements that are unaffiliated with a data element group.

FIG. 6 is an example user interface 600 allowing the creation of one or more data element groups according to techniques presented herein. When a user selects to create a new data element group, user interface 600 may be displayed, where a user may be able to select general settings, objectives, and/or constraints for the data element group. These selections may automatically propagate to any data elements associated with the data element group. Settings selected in the data element group user interface 600 may be reflected in the campaign user interface 500.

The user may also select a status 515 of the data element group, which may reflect whether any data elements in the data element group may be used in the real world, such as for advertising. The data element group may be "paused" by default, such that ad space associated with the data elements of the data element group would not be obtained. If the data element group is set to "live," a user may still be able to individually pause data elements associated with the data element group.

The user may further select a data element group name 510, and may designate any notes or comments 605 about the data element group. The user may also select one or more start and end dates 607 of the data element group, which may represent dates promotional data elements may run in one or more forms of media. Additional start and end dates may be designated, such as by selecting a flight option 610. As used herein, a period between a start and end date may be known as a "flight."

The user may also designate a data element group goal 615, which may indicate a total budget (spend total) for the data element group. The user may also be able to switch auto-allocation 620 on and off, which enables automatic optimization of data elements associated with the data element group, as will be further described herein. The objectives may be optimized across data elements of the data element group based on "mid-flight" metrics or other performance data. Once a minimum level of performance data is obtained, usage of a given data element and budget associated therewith may be refined at regular time intervals, such as daily. If the user turns off automatic allocation 620, the user may still be able to manually allocate data element goals for data elements, for example in the data elements tab.

Goals or objectives set at the data element group level may be set to adhere to goals set at higher object levels, such as at the campaign level. For example, start and end date ranges 607 may be prohibited from going outside of any start or end date ranges set at the campaign level. The spend total may be set to be equal to or less than the spend total set at the campaign level, if set.

As an example, a user may set automatic budget allocation 620 across one or more data element groups and independent data elements, and automatic performance optimization for data element usage within a data element group. Optimization techniques, such as linear programming, may be used to optimize for multiple goals while staying within any number of constraints. The optimization may occur recursively up or down through the object hierarchy. A first constraint set at the campaign level may be a spend goal of $2.5 million. The start and end dates may be set as the month of October, 2014. Based on one or more campaign-level or other constraints, data element groups may be automatically or manually created corresponding to one or more audience segments.

The example campaign may contain any number of data element groups. A first data element group may correspond to would-be Toyota buyers. A user may set delivery constraints at the data element group level. For example, the user may set the spend goal for the data element group to be $1 million, and the maximum eCPM to be $15. The user may also set objectives or goals, for example a target audience of females aged 18-49, with a click-through rate goal of 2%.

A second data element group may correspond, for example, to Honda customers. A user may set delivery constraints at the data element group level. For example, the user may set the spend goal for the data element group to be $500,000, and the maximum eCPM to be $10. The user may also set objectives or goals, for example a target audience may be set to adults 18 and over, and a completion rate goal may be set to 85%. As discussed above, individual data elements may be associated with a campaign regardless of whether they are associated with a data element group. For example, the user may create an individual promotional data element with a spend goal of $500, the maximum eCPM of $12, and with an objective of minimizing cost per thousand impressions (CPM). Further, as discussed above, while the campaign may be automatically optimized, a user may manually set budgets of unaffiliated data elements, one or more data element groups and/or individual data elements within groups.

FIG. 7 is an example user interface 700 illustrating further user settings that may be configured when creating a data element group. The user may designate other objectives and/or constraints in addition to budget. For example, the user may designate impression targets or gross data element revenue targets to be automatically optimized. As a restrictive goal, the user may also designate a cap for the frequency 705 that a data element may be used in a campaign. Frequency capping may be managed at the data element group level, and may override frequency capping at the data element level. As noted previously, frequency capping may conform to the frequency capping setting from the campaign object.

Additional constraints may also be set by the user when creating a campaign, data element, or, in the example shown in FIG. 7, a data element group. The user may further set a cost per thousand impressions price cap 710. A buyer margin 715, for example a percentage of media costs and/or vendor fees, and a pass-through cost 720, such as a cost per thousand constraint, may also be designated. Pass-through costs 720 may include other costs and third party fees which may not be otherwise directly logged in application 140. Owners 305 may wish to include pass-through costs to ensure that the media cost numbers, which may be defined as the maximum bid minus any pass-through costs, are realistic. For example, if the maximum bid is $10, but there are $3 in expected data costs, up to $7 is left to be allocated for the media cost. If any of the billing fields are set, they may bind any data elements associated with the data element group. As a result, changing billing fields in the settings of associated data elements may be disabled.

Figure 8:
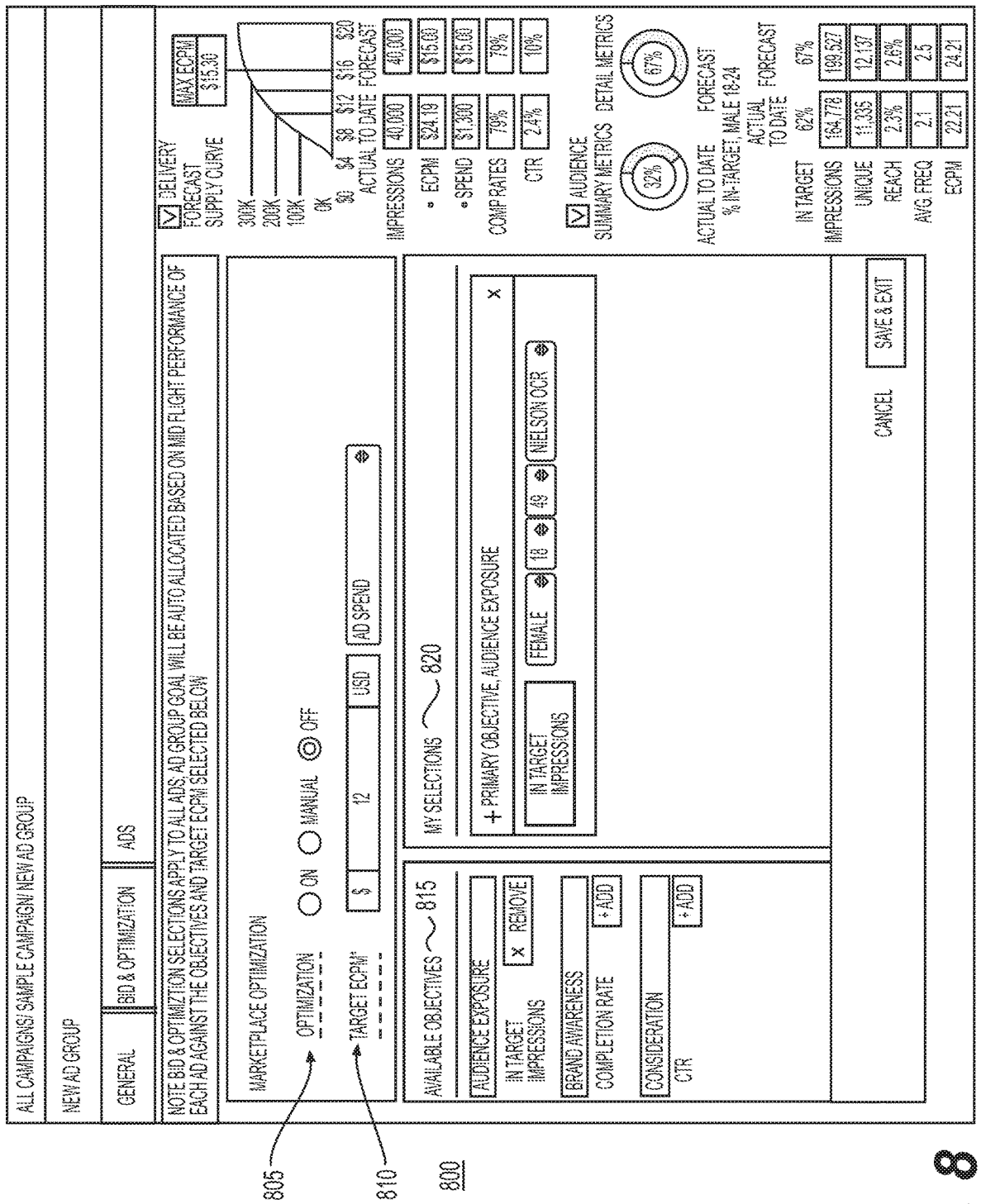
FIG. 8 is an example user interface enabling the selection of objectives associated with groups of data elements according to techniques presented herein.

FIG. 8 further illustrates the selection of objectives associated with the creation of a data element group according to techniques presented herein. Selections on the user interface 800 may be automatically applied to one or more data elements associated with the data element group. As discussed above, data element group objectives may be optimized by allocating resources based upon performance of data elements at some predetermined time period after the start of the campaign (i.e. "mid-flight"). The performance of one or more associated data elements may further be determined given any objectives and/or constraints defined in the user interface 800.

The user may select whether optimization 805 for the data element group is set to on, off, or manual. If the data elements are being used for advertising, selecting "on" may mean that the application will automatically deliver impressions based on a real-time marketplace for each data element at the lowest possible price to meet the required objectives of the data element group. Optimization 805 may be turned on by default. In order enable manual or turn off optimization 805 at the data element group level, the user may be required to turn off "Auto Allocation Across Data Elements" in user interface 600. The optimization 805 setting may automatically propagate to all data elements associated with the data element group.

The user may also select a target eCPM 810, which, as indicated by the asterisk, may be a mandatory field. As discussed above, the eCPM 810 is the effective cost per thousand impressions, and may be calculated by dividing total earning for data elements in the data element group by total number of impressions of data elements in the data element group in thousands. Associated data elements or "child data elements" may be unable to use a different target eCPM when data element group optimization 805 is turned on. The target eCPM 810 may be enforced as a restrictive ceiling. If automatic goal allocation 620 is turned off, child data elements may be able to have a different target eCPM as long as they are at or below the target eCPM goal. If automatic goal allocation 620 is turned on, the optimizer may determine the best way to allocate the budget (impression, spend or gross revenue) across any child data elements. Once enabled, a user may be restricted from editing the delivery goal, target eCPM, and/or objectives at the individual data element level.

Multiple objectives 815 may be selected by a user and ranked in the selections list 820. For example, a user may designate a primary objective, a secondary objective, a tertiary objective, etc. The data element group optimization algorithm may take the ranking into account when optimizing allocation of resources across a given set of data elements, given the assigned objectives and constraints. For example, objectives may be assigned varying weights that affect how optimization is performed. Positive factoring may be given to higher priority objectives such that the application 130 may be more likely to bid for space which meets a higher priority objective (within the maximum CPM goal or other constraints), rather than a lower priority objective.

The importance of each objective in a list or hierarchy of objectives may be reflected by the allocated bidding price. The dedicated bidding price allocated for each objective may be a weighted portion of the maximum CPM (or other budgetary constraint), while the weight of each objective may correspond to the priority level (i.e., higher priority objectives may be given higher weights). The assigned budget may also be adjusted by the achievement difficulty and rareness of a given objective.

For example, a user may designate a list of objectives 820. A primary objective may be in-target impressions of females 18 and up, a secondary objective may be a completion rate of at least 80%, and a tertiary objective may be a CTR of at least 1%. The total target eCPM 810 may be $15. Initially, a largest portion, for example 50%, of the eCPM may be automatically allocated to the primary objective, in this case the in-target objective. A second largest portion, such as 33%, may be allocated to the secondary objective. And a smallest portion, such as 17%, may be allocated to the tertiary objective. The bids may then be automatically adjusted by rareness. For example, the average in-target rate may be 25%, so in-target impressions may receive an eCPM of $30. Completed impressions may receive an eCPM of $6.25 (assuming an average completion rate of 80%), and CTR may receive $250 eCPM (assuming an average CTR of 1%).

After the campaign begins, in mid-flight the allocations may be adjusted by achievement difficulty. For example, if the secondary objective average completion rate of 80% is achieved, allocations may be increased to the primary and/or tertiary objectives to increase the likelihoods that they will also be met. In other words, allocations for objectives with a low achievement difficulty may be reduced relative to other objectives with a higher achievement difficulty. This behavior is not necessarily binary. Rather, as a given objective becomes closer to being met, the allocation may be correspondingly reduced.

Figure 9:
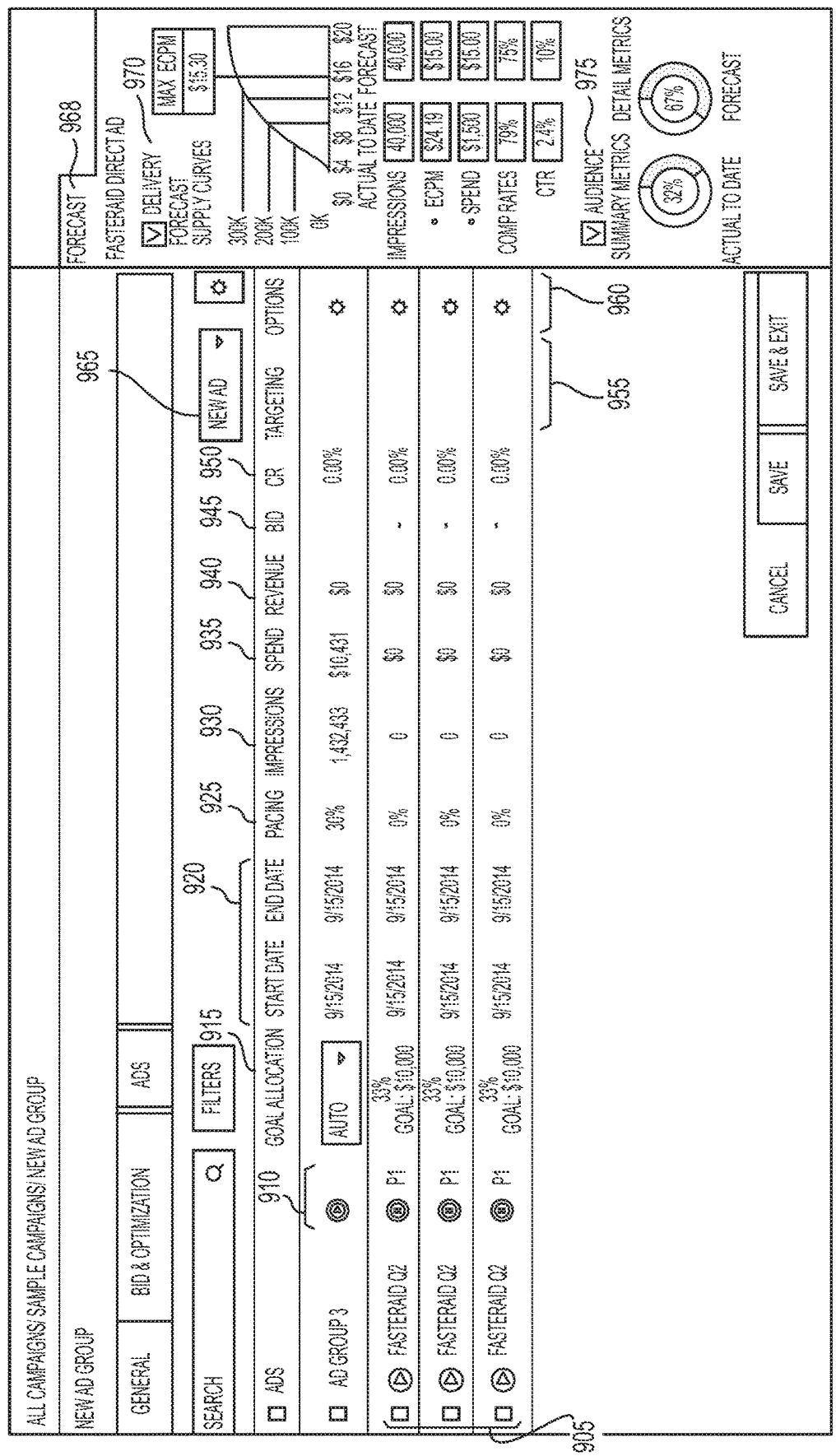
FIG. 9 is an example user interface enabling the creation and/or selection of data elements that may be associated with a data element group.

FIG. 9 is an example user interface 900 further allowing the creation, modification, and/or selection of data elements and attributes that may be associated with the creation of a data element group. The user interface 900 may list data elements associated with the data element group 905. Each data element may have an associated status indicator 910, a goal allocation 915, a start date and end date of use 920, for example if the data elements are advertisements in a campaign, a pacing percentage 925, which determines how promotional data elements are spaced out in time, a number of impressions 930, the spend total 935, the revenue generated 940, the associated bid 945, the click rate 950, the targeting 955, and other options 960 and 965. The user interface 900, along with other user interfaces presented herein, may display a forecasted delivery, such as a supply curve for eCPM. The audience for a selected data element group or data element may also be forecasted 975.

Several of these fields will now be discussed in greater detail. The goal allocation field 915 may determine how much of an available budget is intended to be spent on data elements in the data element group. If the user has selected automatic allocation 620, the default may be set to auto in the goal allocation field 915. The user may be able to set the goal allocation field 915 to manual, which may in turn switch the selection in the automatic allocation field 620 in a corresponding manner. The percentages of the goal allocation field 915 may be required to total 100%. The allocation percentages may be not editable if automatic allocation 620 is enabled, as the percentages would be decided by the optimization features of the application. If a budget has been set at the data element group level, then the budgets of all of the data elements within the data elements may be set to remain equal to or below the data element group total.

If, on the other hand, the goal allocation field 915 is set to manual, a user may be able to adjust the percentages of each data element. As a default, a manual setting may result in the first data element receiving a 100% allocation, which may then be modified by the user. The goal estimate, which may be a dollar amount under the goal allocation field 915, may be not editable by the user, and may be derived only from the percentage designated and the budget of the data element group. The sum of the allocation percentages may be set to total 100%. A user may also be able to allow a portion of the budget to be automatically allocated, and a portion to be manually allocated.

Status indicators 910 may be placed near goal allocation percentages. The status indicators 910 may be colors or symbols, such as green or red, up or down arrows, etc. The status indicators 910 may have a first status if the allocation is increasing (an indication that the data element has been determined to be more effective at reaching objectives than in previous optimization cycles), and another status if the allocation is decreasing (an indication that the data element has been determined to be less effective at reaching objectives than in previous optimization cycles). A third status may also exist if the allocation has not changed in the recent allocation cycle from a prior allocation percentage. For example, if a data element allocation is increasing, the associated status indicator may be green. If the allocation is decreasing, it may be red, and if the allocation is the same or within a predetermined distance from the same allocation, the status indicator may be gray.

A user of the application may be able to add new data elements in one or more ways, such as by clicking a button 965 on the user interface. A user may further be able to edit the settings of each data element, clone a data element (which may be automatically associated with the data element group), and/or delete data elements.

One or more user interfaces presented herein may also display a forecast window 968. A user may be able to toggle between different forecast views. A default view may be an aggregated data element group forecast. An aggregated data element group forecast is a summarized view of all child data elements. Alternatively or in addition, the application may also be able to display a forecast window for individual data elements. In response to a user clicking on an individual data element, the forecast window for the individual data element may be displayed. Similarly, clicking on a data element group may cause the aggregated data element group forecast to be displayed.

The application may also create reports about data element groups and data elements for display. Report keys may comprise one or more of: a data element group, data element group end date, data element group goal or objective, data element goal or objective type, data element group identifier, data element group pricing type, data element group start date, and a data element group type. Similar reports may be generated for individual data elements, for campaigns, or for a group of associated campaigns.

Data element group optimization will now be further discussed. At a high level, data element group optimization may involve a user inputting a strategy. Accordingly, objectives and/or constraints such as flight, budget, performance goals and associated data elements may be defined. The data elements may have a common KPI goal, which will guide the application to allocate the budget accordingly. Once the data element group has been created, promotional data elements may be run, and associated performance data may be collected, for example on a certain time interval such as on a daily basis. The budget may then be assigned across data elements based on the performance data and any constraints or restrictions (e.g. a minimum spend notwithstanding goal). The performance data may allow a determination of which data elements are better meeting the one or more objectives, such as, for example, by attracting higher click rates and/or click-through rates. The budget may be assigned for a subsequent time interval, such as for a day, and it may be reevaluated at each time interval. Alternatively, optimization may be performed in real time. Each data element may be given a training budget such that each data element may have the chance to prove itself effective, for example in an advertising scenario. A statistically significant amount of performance data for a given data element may be required to be collected before a data element's budget may be reduced below a predetermined threshold, such as being reduced to zero. Data element groups may be required to make a first budget allocation to each data element in the group within a predetermined time period, such as within 48 hours of the data element group flight. This process may iteratively loop each time interval until the campaign ends. Over time, as performance data accumulates, the application may become more aggressive in assigning resources such as budget to data elements that prove to be more effective.

For data elements with in-target goals, where there is no feedback loop, it may be assumed that if a data element is using an online campaign ratings (OCR) application, a feedback loop may be used to assess actual performance. If a data element is not using an OCR application, it may be assumed that the optimization estimates were delivered.

Possible features of the data element group optimization algorithm will now be discussed in greater detail. The algorithm may determine the selected goals of the data element group, for example budget desired, cost per thousand cap, KPI goals, flight length, etc. After the data element group has run for a period of time, such as a predetermined time interval, the achieved goals of the data element group may be determined, such as budget delivered, money spent, KPIs delivered, etc. The data element group plan for the next time interval, such as a predetermined time interval cycle, may then be determined. Based on the budget delivered, the minimal training size of the data element group may be determined. Based on the average KPI (supply), the KPI goals (demand), and the indicated priorities, the value of each KPI may be evaluated (the same as controller optimization) as a data element group buying plan. The achieved KPI of each data element in the data element group may then be read, for example, in terms of click counts, completion counts, conversion counts, etc. Achieved KPI performance data may be converted to click rate, completion rate and conversion rate, etc. Based on the achieved KPI of each data element and the determined value of each KPI, the value of each data element towards the data element group may be evaluated. The value may be determined as, for example, by multiplying the KPI of the data element by the buying plan (the buying plan may be a representation of the importance of each objective) of the data element group. The forecasted KPI of each data element in the next cycle may then be read.

Based on a received or determined forecasted KPI, the opportunity risk of the value of the data element dropping may be modeled. The forecasted supply of each data element in the next cycle may then be received or determined. The budget for each data element in the data element group may then be optimized, for example by linear programming. A feasibility region within a range of constraints may be determined, and the optimum distribution of resources may further be determined in part based upon which point in the feasibility region most effectively meets the objectives. In particular, intersection points of constraint lines along edges of the feasibility region may be evaluated. The optimization may be determined, for example, using the following technique:

MAX sum(DEperform*DEbudget)
S.T sum(DEbudget)=DEGgoal
0<=sum(DEbudget*eCPM)<=DEGspend_goal
BOUNDS: DEmingoal<=DEbudget<=DEmaxsupply The objective of these equations may be to maximize the aggregated performance at the data element group level. The DEbudget may represent the budget allocated to each data element in a data element group, while DEperform may represent the performance of each data element. The constraints may be data element group level budget (DEGgoal and DEGspend_goal), and data element level supply (DEmaxsupply) and a data element configuration goal minimum (DEmingoal). The solution may then be provided to the data element level optimizer.

FIG. 10 is an example user interface 1000 configured for enabling creating and/or editing data elements that may be associated with a data element group. After selecting to create a data element in the application 140, such as one associated with a data element group, the user may be shown user interface 1000. The status 1005 of the data element may be shown as either paused or live. If a data element is changed from live to paused mid-flight (during a campaign), a warning message may be displayed, and subsequent action by the application taken, that automatic allocation will be set to 0% in the data element group user interface 900 and elsewhere. The budget may then be re-optimized for any remaining live data elements in the data element group, and/or for any data elements left in the campaign generally. A user may be prohibited from changing the status from live to paused unless he or she has also set the manual goal allocation to 0% in the data element group user interface 900.

The data element name 1010 may be designated by the user. The data element group 1015 associated with the data element may also be indicated. As discussed previously, the data element may inherit pricing and optimization criteria, as well as any other restrictions or constraints set at the data element group level.

A start date and end date 1020 (flight), in the case of published or promotional data elements, may also be displayed and input by the user. Flight dates of individual data elements may be prohibited from falling outside of the one or more flight dates of the parent data element group.

Objectives or goals 1025 may also be designated at the data element level. However, if the data element group optimization is activated, this section may be deactivated. A message may be provided to the user indicating that, to enable data element goal selection, the auto allocation across data elements 620 should be turned off. The data element group optimization algorithm may automatically allocate a subset of the data element group.

If the automatic allocation across data elements 620 is set to on, there may be no specific goals that can be added for the data element. However, the user may be able to determine a minimum level allocation per data element. For example, the user may set the minimum number of impressions that must be provided for the data element, in the case of advertising. The minimum level (along with the combined minimum levels set by other data elements) may be prohibited from exceeding the value set at the data element group level. The minimum goal may be allocated to the data element even if the data element is underperforming relative to other data elements on the selected optimization objectives. Even if a minimum goal is selected, the application optimizer may still designate a higher number if the data element outperforms other data elements in the data element group based on, for example, mid-flight performance.

Figure 11:
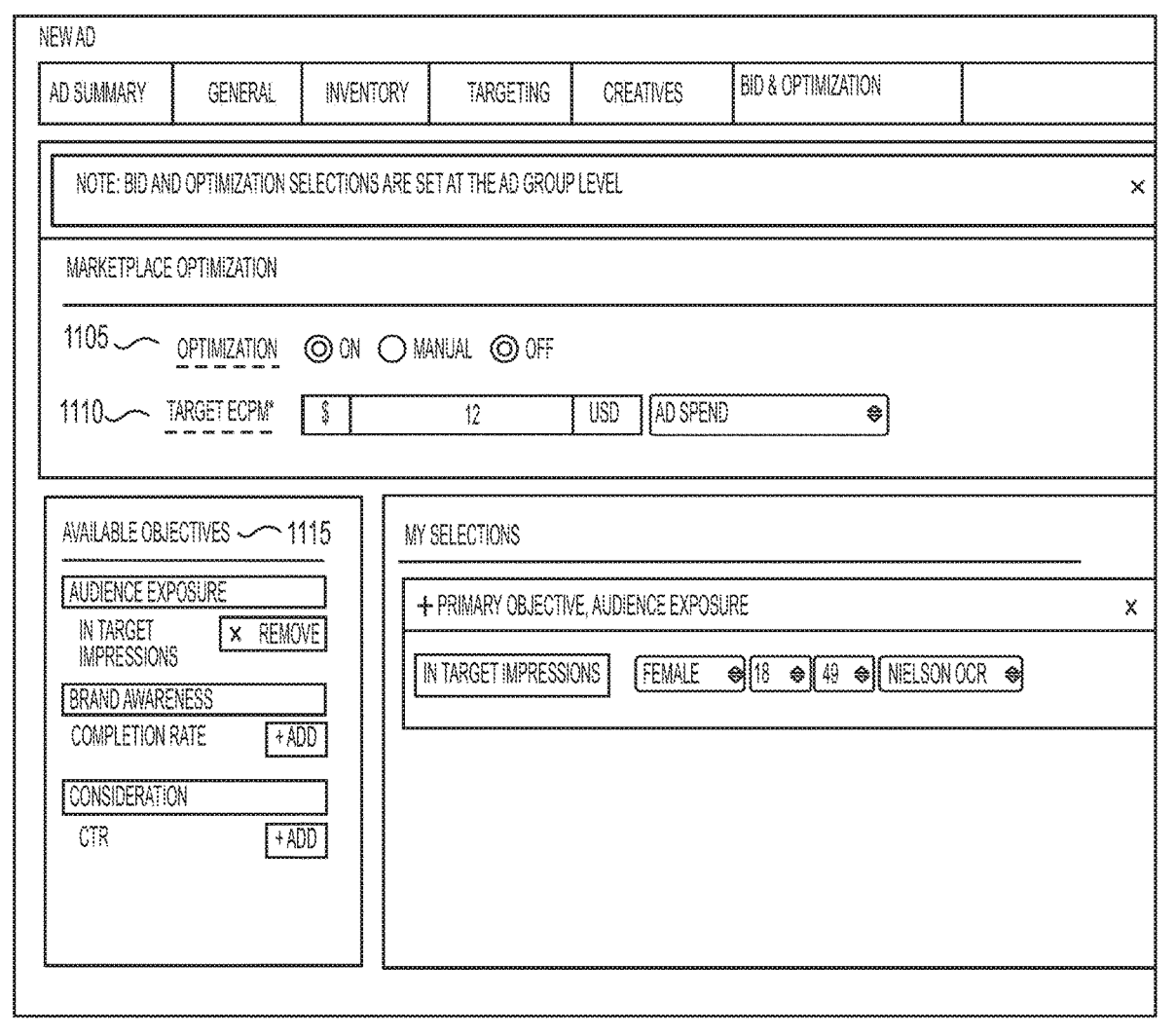

FIG. 11 is an example user interface 1100 displaying a data element bid and optimization page, which may be associated with the creation and/or editing of data element metadata, according to techniques presented herein. If the associated data element is part of a data element group with optimization 1105 turned on, the user interface 1100 may be non-editable. The user may not be able to change the target eCPM 1110 or any of the objectives 1115. If, however, automatic goal allocation is set to manual, or turned off, the user may be able to edit the target eCPM and/or objectives 1115. As a result, each data element within a data element group and campaign may be able to have different optimization goals.

As discussed above, optimization may be performed across data element groups 330, as well as across particular data elements 315, regardless of whether they are affiliated with a data element group. The objectives and/or constraints of the data element may be determined, for example, in terms of budget desired, cost per thousand impressions cap, KPI goals, flight length, etc. The achieved goals and/or constraints of the data element may also be determined, for example, in terms of budget delivered, money spent, KPI delivered, etc. The data element budget, cost per thousand impressions cap, etc., may then be determined for the next cycle, where the cycle may be a predetermined period of time. Based on the pacing of the budget goal, e.g., the rate at which the budget is being spent, the base value may be adjusted. Adjusting the base value may help keep pacing at or near 100%. The base value may represent the importance of the pacing objective. Pacing may automatically be given a non-configurable top priority, so the system may calculate a base value first. The importance of each KPI may then be determined based on the average KPI (supply, the KPI goal (demand), and/or any user-indicated priorities. The optimization algorithm may then attempt to maximize the one or more KPIs with respect to cost per thousand impressions.

Figure 12:
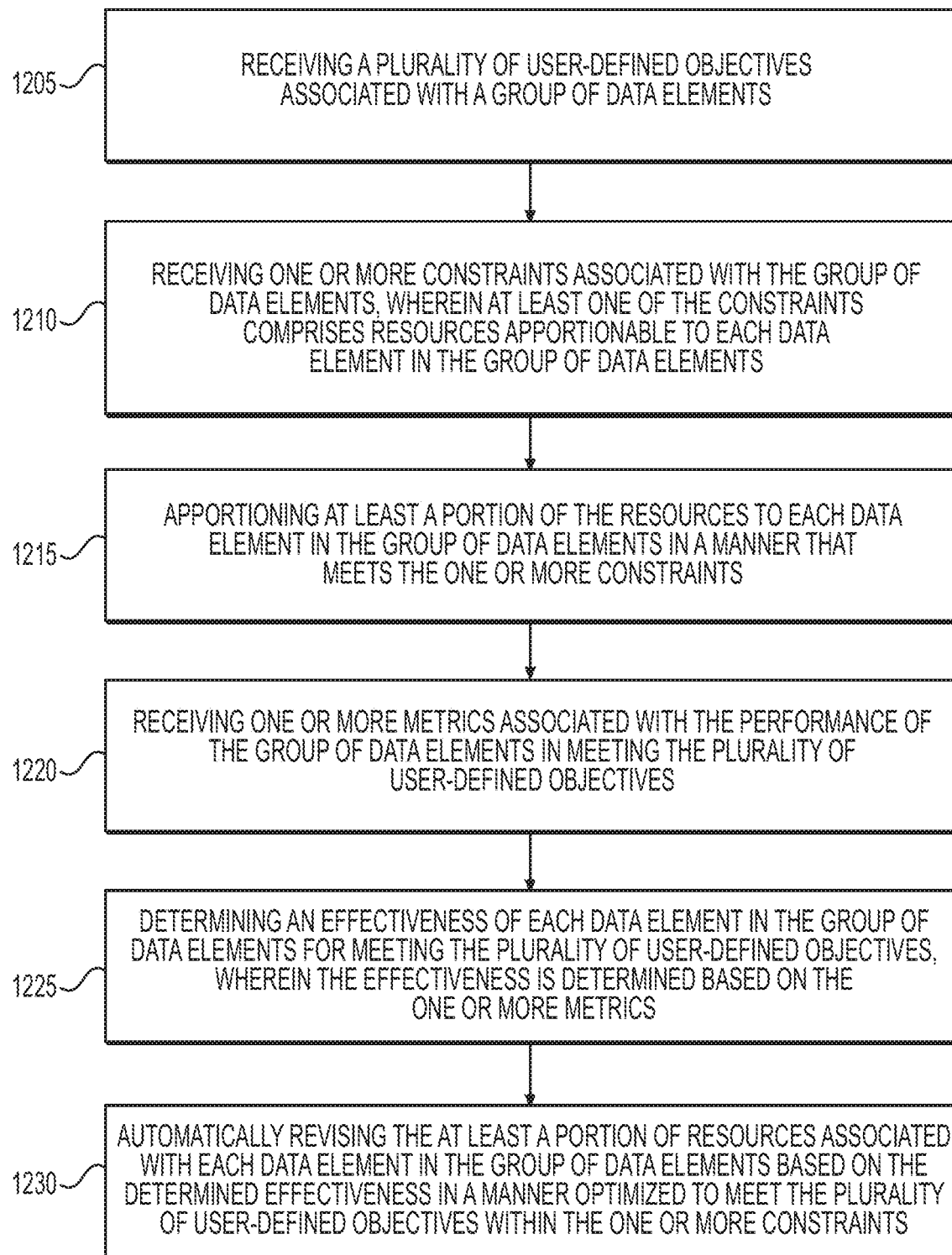
FIG. 12 is a flow diagram illustrating an example method according to techniques presented herein.

FIG. 12 is an example block diagram illustrating systems and methods according to techniques presented herein. At step 1205, a plurality of user-defined objectives associated with a group of data elements may be received. At step 1210, one or more constraints associated with the group of data elements may be received, wherein at least one of the constraints comprises resources apportionable to each data element in the group of data elements. At step 1215, at least a portion of the resources may be apportioned to each data element in the group of data elements in a manner which meets the one or more constraints. At step 1220, one or more metrics associated with the performance of the group of data elements in meeting the plurality of user-defined objectives may be received. At step 1225, an effectiveness may be determined for each data element in the group of data elements for meeting the plurality of user-defined objectives, wherein the effectiveness is determined based on the one or more metrics. At step 1230, the at least a portion of resources associated with each data element in the group of data elements may be automatically revised based on the determined effectiveness in a manner optimized to meet the plurality of user-defined objectives within the one or more constraints.

Techniques presented herein may provide a differentiated buying tool allowing one or more owners 305 to purchase space for promotional data elements 315 that may eliminate substantial manual work and provide real-time optimal allocation of resources to data elements. In addition, the optimization algorithm may work recursively up or down the object hierarchy, thus increasing the efficiency of optimization according to objectives and/or constraints. While many settings discussed herein may be able to be set at the data element group level, these same settings may be set at the campaign level and/or data element level, unless expressly stated otherwise herein. More generally, any setting which may be configured at any level of the object hierarchy may also be configured at any other level of the object hierarchy, unless expressly stated otherwise herein. All user interfaces shown herein, or combinations thereof, may be present in various embodiments, and may be presented to one or more users. All features discussed herein may have associated security requirements before they may be used. For example, different users of the application may have different levels of privileges, allowing them to access differing features of the application. In addition, many steps of techniques discussed herein are disclosed in a particular order. In general, steps discussed may be performed in any order, unless expressly stated otherwise.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and a methods for optimizing data element usage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for optimizing graphical data element usage according to a plurality of objectives, comprising:
   receiving through a graphical user interface, at a server, a first user input by a user to manually optimize a goal allocation;
   receiving through the graphical user interface, at the server, a second user input by the user of a plurality of weighted objectives associated with one or more graphical data elements;
   receiving through the graphical user interface, at the server, a third user input by the user of one or more constraints associated with the graphical data elements;
   determining, using a recursive optimization algorithm, an optimized allocation of resources based on the weighted objectives and the one or more constraints;
   apportioning, by the server, at least a portion of resources to the graphical data elements based on the determined optimized allocation of resources;
   automatically displaying, on the graphical user interface, a forecasting graph based on the determined optimized allocation of resources;
   receiving through a graphical user interface, at a server, a fourth user input by a user to automatically optimize the goal allocation;
   receiving, at the server, one or more distribution performance metrics associated with the performance distribution of the graphical data elements across an electronic network;
   determining a minimum level of the one or more distribution performance metrics has been received at the server;
   based on the minimum level being reached and the user input to automatically optimize the goal allocation, automatically revising, at the server, the optimized allocation of resources based on the recursive optimization algorithm, the distribution performance metrics, and by selecting a candidate optimization point from one or more candidate optimization points that intersect with points of constraints, the selected candidate optimization point maximizing a highest priority of the plurality of weighted objectives;
   distributing, by the server, a remaining portion of fiscal distribution resources associated with each graphical element based on the automatically revised optimized allocation of resources; and
   automatically displaying, on the graphical user interface, an adjusted forecasting graph based on the automatically revised optimized allocation of resources.

2. The computer-implemented method of claim 1, wherein at least one of the fiscal constraints comprises fiscal distribution resources apportionable for the distribution of each graphical data element in the graphical data elements.

3. The computer-implemented method of claim 1, further comprising:

determining, at the server, an effectiveness of each graphical data element in the graphical data elements for meeting the plurality of weighted objectives, wherein the effectiveness is determined based on the one or more distribution performance metrics.

4. The computer-implemented method of claim 1, further comprising:
receiving an additional fiscal constraint for association with the one or more fiscal constraints; and
automatically revising the at least a portion of fiscal distribution resources associated with each graphical data element in the graphical data elements based on the additional fiscal constraint.

5. The computer-implemented method of claim 1, wherein the optimization server comprises a plurality of servers.

6. The computer-implemented method of claim 1, further comprising:
designating a predetermined minimum allocation of the fiscal distribution resources to each graphical data element in the graphical data elements until a predetermined minimum level of electronic distribution metrics associated with each graphical data element in the graphical data elements is obtained.

7. The computer-implemented method of claim 6, further comprising:
lowering the predetermined minimum allocation of the fiscal distribution resources for each graphical data element in the graphical data elements as electronic distribution metrics are obtained associated with each graphical data element in the graphical data elements.

8. The computer-implemented method of claim 1, wherein the one or more distribution performance metrics are determined over a predetermined time interval.

9. The computer-implemented method of claim 1, wherein each graphical data element in the graphical data elements corresponds to a promotional video.

10. The computer-implemented method of claim 1, wherein the automatic revising the at least a portion of resources is based on an achievement difficulty.

11. A system for optimizing graphical data element usage according to objectives, the system including:
a data storage device storing instructions for optimizing graphical data element usage according to objectives; and
a processor configured to execute the instructions to perform a method including:
receiving through a graphical user interface, at a server, a first user input by a user to manually optimize a goal allocation;
receiving through the graphical user interface, at the server, a second user input by the user of a plurality of weighted objectives associated with one or more graphical data elements;
receiving through the graphical user interface, at the server, a third user input by the user of one or more constraints associated with the graphical data elements;
determining, using a recursive optimization algorithm, an optimized allocation of resources based on the weighted objectives and the one or more constraints;
apportioning, by the server, at least a portion of resources to the graphical data elements based on the determined optimized allocation of resources;
automatically displaying, on the graphical user interface, a forecasting graph based on the determined optimized allocation of resources;
receiving through a graphical user interface, at a server, a fourth user input by a user to automatically optimize the goal allocation;
receiving, at the server, one or more distribution performance metrics associated with the performance distribution of the graphical data elements across an electronic network;
determining a minimum level of the one or more distribution performance metrics has been received at the server;
based on the minimum level being reached and the user input to automatically optimize the goal allocation, automatically revising, at the server, the optimized allocation of resources based on the recursive optimization algorithm, the distribution performance metrics, and by selecting a candidate optimization point from one or more candidate optimization points that intersect with points of constraints, the selected candidate optimization point maximizing a highest priority of the plurality of weighted objectives;
distributing, by the server, a remaining portion of fiscal distribution resources associated with each graphical data element based on the automatically revised optimized allocation of resources; and
automatically displaying, on the graphical user interface, an adjusted forecasting graph based on the automatically revised optimized allocation of resources.

12. The system of claim 11, wherein the processor is further configured for:
receiving an additional fiscal constraint for association with the one or more fiscal constraints; and
automatically revising the at least a portion of fiscal distribution resources associated with each graphical data element in the graphical data elements based on the additional fiscal constraint.

13. The system of claim 11, wherein the optimization server comprises a plurality of servers.

14. The system of claim 11, wherein the processor is further configured for:
designating a predetermined minimum allocation of the fiscal distribution resources to each graphical data element in the graphical data elements until a predetermined minimum level of electronic distribution metrics associated with each graphical data element in the graphical data elements is obtained.

15. The system of claim 14, wherein the processor is further configured for:
lowering the predetermined minimum allocation of the fiscal distribution resources for each graphical data element in the graphical data elements as electronic distribution metrics are obtained associated with each graphical data element in the graphical data elements.

16. The system of claim 11, wherein the processor is further configured for automatic revising the at least a portion of resources based on an achievement difficulty.

17. A non-transitory computer-readable medium storing instructions that, when executed by at least one processor, cause the at least one processor to perform a method of optimizing graphical data element usage according to objectives, the method including:
receiving through a graphical user interface, at a server, a first user input by a user to manually optimize a goal allocation;
receiving through the graphical user interface, at the server, a second user input by the user of a plurality of weighted objectives associated with one or more graphical data elements;

receiving through the graphical user interface, at the server, a third user input by the user of one or more constraints associated with the graphical data elements;

determining, using a recursive optimization algorithm, an optimized allocation of resources based on the weighted objectives and the one or more constraints;

apportioning, by the server, at least a portion of resources to the graphical data elements based on the determined optimized allocation of resources;

automatically displaying, on the graphical user interface, a forecasting graph based on the determined optimized allocation of resources;

receiving through a graphical user interface, at a server, a fourth user input by a user to automatically optimize the goal allocation;

receiving, at the server, one or more distribution performance metrics associated with the performance distribution of the graphical data elements across an electronic network;

determining a minimum level of the one or more distribution performance metrics has been received at the server;

based on the minimum level being reached and the user input to automatically optimize the goal allocation, automatically revising, at the server, the optimized allocation of resources based on the recursive optimization algorithm, the distribution performance metrics, and by selecting a candidate optimization point from one or more candidate optimization points that intersect with points of constraints, the selected candidate optimization point maximizing a highest priority of the plurality of weighted objective;

distributing, by the server, a remaining portion of fiscal distribution resources associated with each graphical element based on the automatically revised optimized allocation of resources; and automatically displaying, on the graphical user interface, an adjusted forecasting graph based on the automatically revised optimized allocation of resources.

18. The non-transitory computer-readable medium of claim 17, wherein the processor is further configured for:
designating a predetermined minimum allocation of the fiscal distribution resources to each graphical data element in the graphical data elements until a predetermined minimum level of electronic distribution metrics associated with each graphical data element in the graphical data elements is obtained.

19. The non-transitory computer-readable medium of claim 17, wherein the processor is further configured for automatic revising the at least a portion of resources based on an achievement difficulty.

* * * * *